Figure 1:
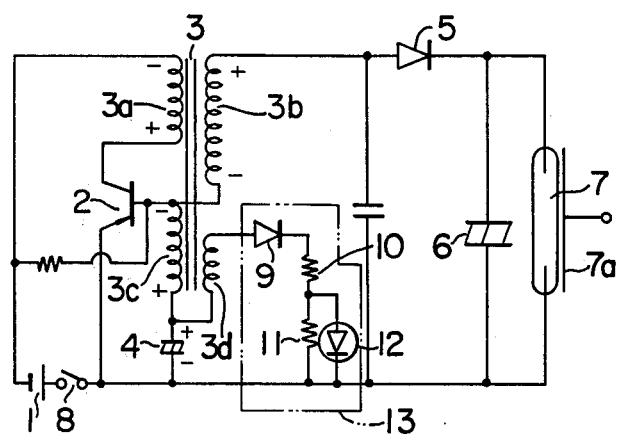

United States Patent [19]

Tanaka

[11] 4,197,484
[45] Apr. 8, 1980

[54] ELECTRONIC FLASH DEVICE WITH VOLTAGE DISPLAY

[75] Inventor: Kazuo Tanaka, Neyagawa, Japan

[73] Assignee: West Electric Co., Ltd., Osaka, Japan

[21] Appl. No.: 897,751

[22] Filed: Apr. 17, 1978

[30] Foreign Application Priority Data

Apr. 19, 1977 [JP] Japan ............................ 52-49878[U]

[51] Int. Cl.² .......................................... H05B 41/32
[52] U.S. Cl. ................................ 315/241 P; 315/135; 340/660; 354/127
[58] Field of Search ............ 315/129, 135, 136, 209 R, 315/241 P; 320/1; 340/660; 354/127, 145

[56] References Cited

U.S. PATENT DOCUMENTS

| | | | |
|---|---|---|---|
| 3,831,079 | 8/1974 | Iwata | 315/241 P X |
| 4,068,150 | 1/1978 | Iwata et al. | 315/241 P |

Primary Examiner—Eugene R. LaRoche

Attorney, Agent, or Firm—Stevens, Davis, Miller & Mosher

[57] ABSTRACT

An electronic flash device comprising a DC-DC converter circuit which converts a low voltage DC source to a high voltage DC current for charging a main discharge capacitor, a flash discharge tube which is adapted to flash by means of the energy stored in the main discharge capacitor, and a display circuit. The DC-DC converter circuit includes an oscillation transformer having a primary winding, a secondary winding magnetically connected with the primary winding, an auxiliary winding and further a second auxiliary winding, an oscillation transistor, and an auxiliary capacitor connected with the auxiliary winding for causing the oscillation transistor to be started; and the display circuit is lit for display when the voltage generated across the second auxiliary winding and the voltage applied across the auxiliary capacitor are superposed to reach a predetermined value.

5 Claims, 2 Drawing Figures

ELECTRONIC FLASH DEVICE WITH VOLTAGE DISPLAY

The present invention relates to an electronic flash device used as an artificial light source for taking a photograph, and in particular to a display means for displaying the voltage developed across the main discharge capacitor.

Such a device has been disclosed in U.S. Pat. No. 4,068,150, which comprises a DC-DC converter circuit having an oscillation transformer, an oscillation transistor, an auxiliary capacitor for oscillating the oscillation transistor, and an auxiliary winding for maintaining the oscillation; and a light emitting diode actuated for display by means of the voltage generated in the auxiliary capacitor and auxiliary winding included in the DC-DC converter circuit.

In this device, the fact that the voltage across the charged auxiliary capacitor and the voltage generated across the auxiliary winding electromagnetically coupled with the primary winding of the oscillation transformer are proportional to the voltage across the charged main discharge capacitor, is effectively utilized.

However, this device has the following disadvantage.

The charging current to the main discharge capacitor is preferably large in view of reducing the charging time period and thus it is necessary to enhance the oscillation of the DC-DC converter, which oscillation is caused by the voltage generated across the auxiliary winding serving to supply the base current to the oscillation transistor for maintaining its oscillation.

On the other hand, since in the device of U.S. Pat. No. 4,068,150 the light emitting diode is connected in parallel with either the auxiliary capacitor or the auxiliary winding, the energy generated by the auxiliary winding which serves to supply the base current to the oscillation transistor is lost partly through the light emitting diode, thus causing the base current to the oscillation transistor to be reduced, that is, the oscillation transistor is prevented from satisfactorily oscillating.

The above-mentioned disadvantage can be avoided by increasing the number of windings of the auxiliary winding for enhancing the oscillation. However, when the number of windings of the auxiliary winding is increased to generate an increased voltage, a large reverse voltage is disadvantageously applied between the base and the emitter of the oscillation transistor during the quiescent period of the transistor, thus causing the oscillation transistor to be liable to be damaged.

Accordingly, an object of the present invention is to provide an electronic flash device wherein the oscillation transistor can be oscillated satisfactorily without any possibility of such damage and further the voltage across the charged main discharge capacitor can be displayed.

Figure 2:
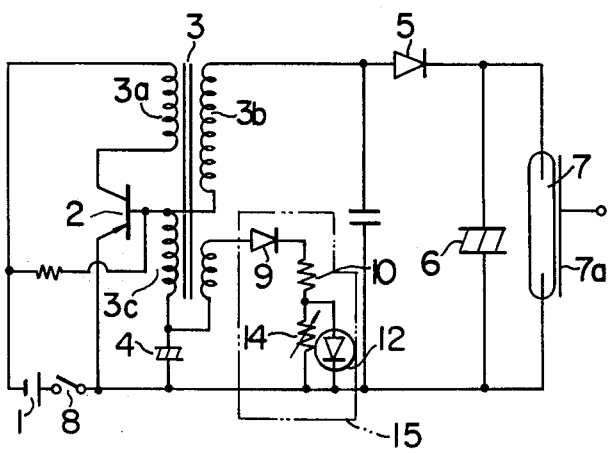

FIG. 1 is a circuit diagram illustrating an embodiment of an electronic flash device according to the present invention, and FIG. 2 is a circuit diagram illustrating another embodiment of an electronic flash device according to the present invention.

FIG. 1 shows an embodiment of an electronic flash device according to the present invention. In FIG. 1, numeral 1 is a DC source, numeral 2 is an oscillation transistor, numeral 3 is an oscillation transformer including a primary winding 3a, a secondary winding 3b, a first auxiliary winding 3c, and a second auxiliary winding 3d magnetically coupled with the auxiliary winding 3c, numeral 4 is an auxiliary capacitor, numeral 5 is a diode, numeral 6 is a main discharge capacitor serving to supply the light emission energy to a flash discharge tube 7, numeral 8 is a switch, and numeral 13 is a display circuit including a diode 9, resistors 10 and 11 and a light emitting diode. The flash discharge tube 7 is supplied at its trigger electrode 7a with a high voltage pulse generated in a conventional trigger circuit (not shown).

Next, the operation of the above-described device will be described.

When the switch 8 is turned on and the source 1 is interconnected to actuate the device; as is well known, the oscillation transistor 2 is oscillated to generate a high voltage at the secondary winding 3b of the oscillation transformer 3, and thus the main discharge capacitor 6 begins to be charged through the diode and also the auxiliary capacitor 4 is charged, in the polarity as shown in FIG. 1, as a result of the main discharge capacitor 6 being charged.

Then, across the auxiliary winding 3c magnetically coupled with the primary winding 3a is generated a voltage through the oscillation operation of the oscillation transistor 2, which voltage induces another voltage across the second auxiliary winding 3d.

The voltage generated across the second auxiliary winding 3d increases in proportion to the voltage across the charged main discharge capacitor 6.

Thus, assuming that the number of windings the primary winding $3a$ to be $n_1$ the number of windings of the secondary winding to be $n_2$, the number of winding of the second auxiliary winding $3d$ to be $n_3$, the voltage generated across the primary winding $3a$ be $E_1$, the voltage generated across the secondary winding $3b$ be $E_2$, and the voltage generated across the second auxiliary winding $3d$ be $E_3$, the following equations are given:

$$E_2 = n_2/n_1 \times E_1 \qquad (1)$$

$$E_3 = n_3/n_1 \times E_1 \qquad (2)$$

From the equations (1) and (2), the following relation results.

$$E_2 = n_2/n_3 \times E_3$$

Since the main discharge capacitor 6 is charged with the voltage $E_2$ the voltage generated across the second auxiliary winding 3d is proportional to the voltage across the charged main discharge capacitor 6.

The voltage $E_3$ generated across the second auxiliary winding 3d is superposed on the voltage across the auxiliary capacitor 4 charged with the voltage generated across the auxiliary winding 3c and the superposed or resultant voltage is applied to the display circuit 13 including the diode 12. Further, the value of the superposed voltage is proportional to that of the voltage across the charged main discharge capacitor 6.

The display circuit 13 can, as shown in FIG. 1, properly divide the voltage applied thereto by suitably adjusting the resistance values of the resistors 10 and 11 so as to control the lighting time of the light emitting diode 12 (the starting time of the light emission) connected in parallel with the resistor 11. Thus, since the voltage which is applied to the display circuit 13 to be divided through the resistors 10 and 11 is proportional to the voltage across the charged main discharge capacitor 6, the control of the lighting time of the light emitting diode 12 through the voltage division ratio between the resistors 10 and 11 is related to the voltage across the charged main discharge capacitor 6 and thus the voltage of the charged main discharge capacitor 6 can be displayed by setting the voltage division ratio through the resistors 10 and 11 in such a manner that the light emitting diode 12 is lit when the voltage across the charged main discharge capacitor 6 reaches a predetermined value.

Although, even while the voltage across the main discharge capacitor 6 is increasing to reach the predetermined value, the light emitting diode 12 is applied with the above-described superposed voltage divided through the resistors 10 and 11; then, the current flowing through the light emitting diode 12 by the divided voltage is controlled to be small. Thus the emission light of the light emitting diode 12 is too low to be perceived.

FIG. 2 is an electric circuit diagram of another embodiment of an electronic flash device according to the present invention. In FIG. 2, the parts having the same reference numerals as those in FIG. 1 have the same functions as in FIG. 1, and a display circuit 15 is similar to the display circuit 13 except that the resistor 11 in FIG. 1 is replaced by a variable resistor 14.

By using the variable resistor 14, the error in the display of the voltage across the charged main discharge capacitor 6 can be avoided, such an error may be caused, for example, by the dispersion or non-uniformity in the values of the lighting voltage, that is, the voltage for providing a sufficient brightness, which is due to the characteristics of the light emitting diode. Thus, by setting properly the resistance value of the variable resistor 14, that is, by making variable the voltage division ratio between the variable resistor 14 and the resistor 10, the voltage across the charged main discharge capacitor 6 can be displayed more precisely.

What is claimed is:

1. An electronic flash device comprising:
    a DC-DC converter which includes an oscillation transformer having a primary winding, a secondary winding, an auxiliary winding and a second auxiliary winding; an oscillation transistor, and an auxiliary capacitor connected with the auxiliary winding for causing the oscillation transistor to be started and converts a low voltage DC source to a high voltage DC current for charging a main discharge capacitor,
    a flash discharge tube which is adapted to flash by means of the energy stored in the main charge capacitor, and
    a display circuit comprising a diode and resistor means connected in series with a light emitting diode wherein the voltage generated across said second auxiliary winding is superposed on the voltage charged on said auxilliary capacitor, and means for applying resultant superposed voltage to said display circuit whereby said light emitting diode emits light in response to the voltage appearing across said resistor means.

2. A device according to claim 1, wherein said light emitting diode is connected in parallel with a first resistor.

3. A device according to claim 2, wherein said first resistor comprises a variable resistor.

4. A device according to claim 1, wherein said second auxiliary winding is provided on the secondary side of said transformer, and said display circuit is connected through said second auxiliary winding across said auxiliary capacitor.

5. An electronic flash device comprising:
    a DC-DC converter which includes an oscillation transformer having a primary winding, a secondary winding, an auxiliary winding and a second auxiliary winding; an oscillation transistor, and an auxiliary capacitor connected with the auxiliary winding for causing the oscillation transistor to be started and converts a low voltage DC source to a high voltage DC current for charging a main discharge capacitor,
    a flash discharge tube which is adapted to flash by means of the energy stored in the main charge capacitor, and
    a display circuit connected to the auxiliary capacitor and second auxiliary winding which indicates when the combination of the voltage generated across the second auxiliary winding and the voltage applied across the auxiliary capacitor reaches a predetermined value.

* * * * *